United States Patent [19]

McEntire et al.

[11] 4,263,381
[45] Apr. 21, 1981

[54] SINTERING OF BETA-TYPE ALUMINA BODIES USING ALPHA-ALUMINA ENCAPSULATION

[75] Inventors: Bryan J. McEntire, Salt Lake City; Anil V. Virkar, Midvale, both of Utah

[73] Assignee: The United States of America as represented by the United States Department of Energy, Washington, D.C.

[21] Appl. No.: 955,431

[22] Filed: Oct. 27, 1978

[51] Int. Cl.³ .................. H01M 10/39; H01M 2/16
[52] U.S. Cl. ...................... 429/193; 264/57; 264/62; 264/65; 264/82
[58] Field of Search .......... 264/82, 65, 66, 57, 264/56, 81, 62; 429/191, 193; 106/65; 138/149, 137, 140, 145, 148, 146

[56] References Cited

U.S. PATENT DOCUMENTS

| | | | |
|---|---|---|---|
| 3,468,719 | 9/1969 | Tennenhouse | 264/65 |
| 3,495,630 | 2/1970 | Hansen et al. | 264/65 |
| 3,607,435 | 9/1971 | Charles et al. | 264/65 |
| 3,655,845 | 4/1972 | Chiku | 264/82 |
| 3,707,589 | 12/1972 | Chiku et al. | 264/66 |
| 3,819,785 | 6/1974 | Argyle et al. | 264/63 |
| 3,896,019 | 7/1975 | Mitoff et al. | 264/63 |
| 3,903,225 | 9/1975 | Jones et al. | 264/57 |
| 3,950,463 | 4/1976 | Jones | 264/57 |
| 4,056,589 | 11/1977 | Lingscheit | 264/65 |

FOREIGN PATENT DOCUMENTS 7602945  3/1976  Netherlands .............................. 264/65

*Primary Examiner*—Donald J. Arnold
*Attorney, Agent, or Firm*—Edmund C. Ross, Jr.; Olin B. Johnson; Hugh W. Glenn

[57] ABSTRACT

A method of sintering a shaped green, beta-type alumina body comprising: (A) inserting said body into an open chamber prepared by exposing the interior surface of a container consisting essentially of at least about 50 weight percent of alpha-alumina and a remainder of other refractory material to a sodium oxide or sodium oxide producing environment; (B) sealing the chamber; and heating the chamber with the shaped body encapsulated therein to a temperature and for a time necessary to sinter said body to the desired density. The encapsulation chamber prepared as described above is also claimed.

8 Claims, 2 Drawing Figures

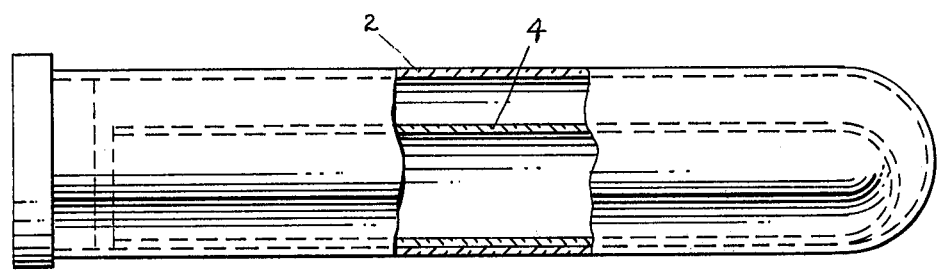
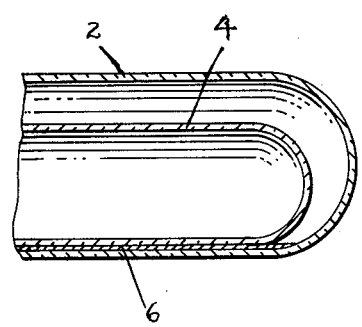

SINTERING OF BETA-TYPE ALUMINA BODIES USING ALPHA-ALUMINA ENCAPSULATION

The invention described herein was made in the course of or under a contract or subcontract thereunder with the Department of Energy.

The invention described herein relates to an encapsulation chamber useful in sintering shaped, green, beta-type alumina ceramic bodies and to a method of sintering such shaped bodies employing such chambers. More particularly, the invention relates to an article and method which are particularly adapted for sintering tubes of beta-type alumina ceramic useful as solid crystalline electrolytes for energy conversion devices such as the sodium sulfur battery.

BACKGROUND OF THE INVENTION

The shaped, green, beta-type alumina ceramic bodies to which the encapsulation chamber and sintering process of this invention are applicable are particularly useful as solid electrolytes in energy conversion devices, particularly those employing molten metals and/or molten metal salts as reactants.

All of these beta-type alumina ceramics exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials which may be processed using the encapsulation chamber and process of this invention are the following:

(1) Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight of aluminum oxide and between about 5 and about 15 weight percent, preferably between about 8 and 11 weight percent, of sodium oxide. There are two well-known crystalline forms of Beta-type-alumina, both of which demonstrate the generic Beta-type-alumina crystalline structure discussed hereinbefore and both of which can easily be identified by their own characteristic X-ray diffraction pattern. Beta-alumina if one crystalline form which may be represented by the formula $Na_2O.11Al_2O_3$. The second crystalline form is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight or material as does the Beta-alumina.

(2) Boron oxide $B_2O_3$ modified Beta-type-alumina wherein about 0.1 to about 1 weight percent of boron oxide is added to the composition.

(3) Substituted Beta-type-alumina wherein the sodium ions of the composition are replaced in part or in whole with other position ions which are preferably metal ions.

(4) Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent. A particularly advantageous method for manufacturing this type of modified or stabilized beta-alumina is disclosed in U.S. patent application Ser. No. 788,572 filed Apr. 18, 1977 now Pat. No. 4,113,928. That method, also called the "Zeta Process" results in a uniform distribution of the selected metal ions throughout the ceramic composition, thus allowing more complete conversion of $\beta$-alumina to $\beta''$-alumina during sintering.

Many of the above polycrystalline materials and some of the electrical conversion devices in which they may be employed as a solid electrolytes are also disclosed in the following U.S. Pat. Nos.: 3,404,032; 3,404,036; 3,413,150; 3,446,677; 3,458,356; 3,468,709; 3,468,719; 3,475,220; 3,475,223; 3,475,225; 3,535,163; 3,719,531; and 3,811,943.

The bi- and multi-metal oxides having the beta-alumina type crystalline lattice make particularly effective separators and/or solid electrolytes for use in energy conversion devices. In the operation of such energy conversion devices, the cations such as sodium in the polycrystalline bi- or multi-metal oxide, or some other cation which has been substituted for sodium in part or whole, migrate in relation to the crystal lattice as a result of effects caused by an electric field. Thus, the solid ceramic electrolytes for which the sintering method of this invention is particularly suited provide selective cationic communication between the anodic and cathodic reaction zones of the energy conversion devices and are essentially impermeable to the fluid reactants employed in the device when the reactants are in the elemental, compound or anionic state. Among the energy conversion devices in which the particular sintered polycrystalline bi or multi-metal oxides, e.g., tubes, enveloped, etc., are useful are: (1) primary batteries employing electrochemically reactive oxidants and reductants in contact with and on opposite sides of the solid electrolyte; (2) secondary batteries employing molten, electrochemically reversibly reactive oxidants and reductants in contact with and on opposite sides of the solid electrolyte; (3) thermoelectric generators wherein a temperature and pressure differential is maintained between anodic and cathodic reaction zones and/or between anode and cathode and a molten alkali metal is converted to ionic form, passed through the polycrystalline wall or inorganic membrane and reconverted to elemental form; and (4) thermally regenerated fuel cells.

The shaped ceramic bodies which are used as solid electrolytes in such energy conversion devices must be of uniform composition and high quality, e.g., good electrical characteristics. For many applications, particularly where tubes or rods are employed, it is also critical that the bodies be free of warpage and bending. The prior art teaches many methods of sintering polycrystalline materials, but in many cases the shaped sintered bodies are warped or bent to a greater or lesser degree.

One explanation for such bending or warping of the shaped member is that temperature gradients exist along the length and width thereof, thus resulting in variations in sintering rate and mechanism which, in turn, results in bending and warping.

In many other cases, the composition of the body being sintered varies or deviates from that largely as a result of the loss of volatile components, such that properties, including electrical characteristics are impaired. Because of this problem of loss of volatile constituents such as sodium oxide or soda from compositions such as beta-type-alumina, it had been necessary in the past, when sintering shaped ceramic bodies for use in electrical conversion devices, to sinter the green body while it is embedded or packed in beta-alumina powder. For example, it had been common practice to sinter the shaped, green ceramic bodies in a crucible such as a platinum-rhodium crucible in which it is packed in coarse powder of beta-alumina, i.e., particles of one micron diameter. While this method is effective in maintaining the soda content of the beta-alumina ceramic, it is particularly troublesome in that it is difficult to remove the sintered shaped ceramic body from the surrounding sintered beta-alumina packing. This, of course, is time consuming and does not render the method acceptable for any type of commercial preparation of the ceramic member. Still another possible disadvantage of the process will be discussed hereinafter.

An alternative to sintering a body while it is packed in a powder of the same or similar composition comprises encapsulating or enclosing the green body to be sintered in a container formed from a noble metal which maintains its shape at the sintering temperature of the body. Noble metals which may be employed as the sintering tube or envelope in the process includes platinum, rhodium, alloys of two or more noble metals and alloys of noble metals with non-noble metals. This noble metal encapsulation process results in shaped bodies which are bend and warp free. To a certain extent it also overcomes the problem of loss of volatile metal oxide, e.g., sodium oxide, from the ware as it is sintered. However, some volatile loss still occurs with the process and the process is highly uneconomical.

A further alternative which might be considered would be saturating the atmosphere in the sintering frunace at the correct vapor pressure so that sintering can be conducted without encapsulation. Two problems exist with this approach, however, First, the Na$_2$O environment is very corrosive and would attack furnace heating elements such as MoSi$_2$ (Super Kanthal) which are used frequently in oxidizing environments over 1500° C. High Na$_2$O activities in the furnace atmosphere may also lead to enhanced corrosion of furnace refractories, setters and saggers. Both of these potential corrosion problems will lead to increased sintering costs in production. Second, tubes which are sintered without any encapsulation may be subject to severe thermal gradients during sintering and subsequent cooling which can lead to problems of warpage, thermal shock cracking, and the introduction of residual stresses in the ceramic after sintering.

BRIEF DESCRIPTION OF THE INVENTION

The process of this invention which employs the encapsulation chamber of the invention is an improvement over the packed powder process, the noble metal encapsulation process and the proposed non-encapsulation process. Briefly, the process comprises: (A) inserting the shaped, green, beta-type alumina body to be sintered into an open encapsulation chamber of the invention; (B) sealing the chamber; and heating the sealed chamber with the shaped body encapsulated therein to a temperature and for a time necessary to sinter the shaped body to the desired density. The open encapsulation chamber of the invention is prepared by exposing the interior surface of a container consisting essentially of at least about 50 weight percent of alpha-alumina and a remainder of other refractory material to sodium oxide or sodium oxide producing environment.

The improved encapsulation chamber of the invention and the process of the invention employing that encapsulation chamber will be more fully understood from the detailed description of the invention which follows when taken in conjunction with the drawings in which:

FIG. 1 shows a fragmentary assembled view of a shaped body to be sintered encapsulated in a sealed encapsulation chamber; and FIG. 2 shows a fragmentary view of an assembly similar to FIG. 1, but with a modified encapsulation chamber.

PRIOR ART

A prior art search with respect to the subject matter of this invention resulted in the citation of the following U.S. Pat. Nos. 3,468,719; 3,495,630; 3,607,435; 3,655,845; 3,707,589; 3,819,785; 3,896,019; 3,903,255; 3,950,463; and 4,056,589. These patents, which represent the closest prior act known to Applicants, do not teach the encapsulation chamber on the process of this invention. U.S. Pat. No. 3,468,719 to Tennenhouse exemplifies the prior art process consisting of packing the body to the sintered in a packing powder. U.S. Pat. No. 3,495,630 to Hansen et al shows a composite refractory tube useful for pressure pouring of molten metal. U.S. Pat. No. 3,607,435 to Charles teaches preparation of a beta-alumina solid electrolyte by firing a mixture of alpha-alumina and sodium meta-aluminate. U.S. Pat. No. 3,655,845 to Chiku teaches exposing a sintered alpha alumina article to a high temperature atmosphere effective to diffuse sodium, potassium, or an oxide thereof into the alpha alumina structure, thereby yielding a product having substantially the same properties as beta-alumina. U.S. Pat. No. 3,707,589 to Chiku et al teaches reheating the article prepared in accordance with the first mentioned Chiku patent in an atmosphere lower sodium oxide concentration. U.S. Pat. No. 3,819,785 to Argyle teaches forming fine-grain alumina bodies by a slip casting technique. U.S. Pat. No. 3,896,019 to Mitoff et al teaches forming beta alumina articles by sintering in an oxidizing atmosphere. U.S. Pat. No. 3,903,225 to Jones et al teaches forming beta alumina articles by sintering followed by an annealing step which is carried out in a closed crucible or with the article buffered by a loose powder of substantially the same composition as the ceramice to reduce loss of volatiles. U.S. Pat. No. 3,950,463 to Jones et al teaches a continuous method of forming beta-alumina articles comprising a particular time and temperature schedule. U.S. Pat. No. 4,056,589 to Lingscheit teaches a method of sintering shaped beta-type alumina bodies in a chamber having distinct inner and outer wall portions, the inner wall being of the same composition as the part being sintered and the outer wall portion being a substantially impervious sintered ceramic which is essentially nonreactive with the body being sintered.

DETAILED DESCRIPTION OF THE INVENTION

The invention relates to an encapsulation chamber or capsule and a method for sintering shaped, green, beta-type alumina bodies using that encapsulation chamber. The, which may be continuous or batch-type, method comprises (A) inserting the body to be sintered into an open chamber prepared by exposing the interior surface of a container consisting essentially of at least about 50 weight percent of alpha-alumina and a remainder of other refractory material to a sodium oxide or sodium oxide producing environment; (B) sealing the chamber; and (C) heating the chamber with the body encapsulated therein to a temperature and for a time necessary to sinter said body to the desired density. The interior surface of the container may initially be coated by coating with a sodium oxide bearing coating which will produce sodium oxide at the temperatures at which the sintering takes place. As the shaped green, beta-type alumina body encapsulated in such a chamber is sintered, the alpha-alumina containing container is exposed to sodium oxide environment created from the soda bearing coating. After the first such sintering operation carried out in such a chamber the chamber may be reused without further treatment. The sodium oxide bearing compound coated may be any material which will produce sodium oxide when heated to the temperature and for the time necessary to sinter beta-type alumina. Such materials may include, for example, sodium aluminate, sodium acetate, sodium carbonate and $Na_2O \cdot x\, Al_2O_3$ wherein X is less than or equal to 11. Other suitable materials will be apparent to those skilled in the art. As will be apparent to the artisan soda bearing materials may be applied in solution, such as for example, an aqueous solution of sodium carbonate.

Rather than forming the treated encapsulation chamber of the invention during the first sintering operation carried out in the container, the container may be prepared in advance. Thus, the encapsulation chambers may be produced in quantity so that they are readily available for use in the process of the invention. Such chambers are prepared by exposing the interior surface of the alpha-alumina containing container to a sodium oxide environment at a temperature of at least about 1250° C., preferably at least about 1400° C., for at least about 1 hour, preferably at least about 8 hours. The sodium oxide environment may be provided by the same soda bearing compounds as discussed above, i.e., materials which release sodium oxide at elevated temperatures employed during treatment of the container. Such materials may be applied to the interior of the container in numerous ways such as by coating on the interior surface, e.g., an aqueous or other solution of these numerous materials. The sodium oxide environment may, of course, be created in other ways also. By way of example, the interior of the container may be filled with a soda bearing compound such as sodium aluminate or $Na_2O \cdot x\, Al_2O_3$ wherein X is less than or equal to 11 and the filled container heated to create the sodium oxide environment.

As noted above the container which is to be treated to form the encapsulation chamber may consist essentially of at least about 50 weight percent of alpha-alumina and a remainder of other refractory materials. Other such materials will be apparent to the skilled artisan. By way of example, such refractories might include calcium aluminate, mullete, beta-alumina, magnesium aluminate, zirconia, etc. These other refractories may be present in the container in amounts ranging from 0 percent when the container is essentially all alpha-alumina up to about 50 weight percent when the container consists of only about 50 weight percent of alpha-alumina.

As mentioned hereinbefore the encapsulation chamber is sealed after the shaped body to be sintered is inserted. Various means of sealing will be apparent to the artisan. By way of example one or more refractory plugs may be used, with or without a noble metal, e.g. platinum, gasket to insure a tight seal.

In one embodiment of the process the encapsulation chamber having the pretreated interior surface may also have enclosed therein with the body to be sintered one or more sodium oxide bearing pellets. These pellets may be formed of any of the soda producing materials such as, for example, sodium carbonate, sodium aluminate, or $Na_2O \cdot X\, Al_2O_3$ wherein X is less than or equal to 11.

FIG. 1 of the drawing shows a fragmentary assembled view of a sealed tubular encapsulation chamber 2 having a tubular green, beta-type alumina ceramic body 4 enclosed therein. The tubular body 4 is shown resting on the floor of the chamber. However, as will be appreciated this disposition of the shaped body within the chamber is not critical nor is the horizontal disposition of the chamber as shown in the drawing. Likewise, the tubular shapes of the chamber and the shaped body are not essential, although they are preferred embodiments. In this preferred tubular form, the chamber and the shaped body may have various cross sections. In one particularly preferred configuration the cross section of the chamber is such that it has a "V" configuration at its base while the shaped body has a circular cross section such that it may rest in and be supported by the base of said chamber during sintering.

FIG. 2 shows a fragmentary view of an alternate arrangement wherein shaped body 4 rather than resting directly on the floor of chamber 2, rests on a noble metal, e.g. platinum, reaction barrier 6 which is interposed between said body and the floor of said chamber.

It will be appreciated that the illustrated embodiments are merely exemplary of some of the configurations that fall within the broad scope of the invention.

The invention will be still more fully understood from the following examples which are merely intended to be illustrative and not limiting.

EXAMPLE

Preparation of Green, Beta-Alumina Tubes

Raw Materials used for producing standard green beta-alumina tubing having a ceramic composition of 8.85% $Na_2O$, 9.75% $Li_2O$ and 90.4% $Al_2O_3$ by weight are: (1) α-alumina (Meller, 0.3 μm, deagglomerated, 99.99% pure), (2) reagent grade sodium carbonate powder and (3) technical grade lithium oxalate powder.

Formulation is accomplished using the "zeta process technique." This procedure involves separate mixing and calcining of (1) a "zeta" component and (2) a soda component. The "zeta" component is made by mixing $Li_2C_2O_4$ and α-$Al_2O_3$ in a weight ratio of about 1 to 5.55. This mixture is then calcined at about 1265° C. for 2 hours. The soda component is made by mixing $Na_2CO_3$ and α-$Al_2O_3$ in a 1 to 5.15 weight ratio followed by calcining.

After calcining the "zeta" and soda components are blended in a weight ratio of 1 to 6.02. This mixture is then dry ball milled in one gallon laboratory mills for from about 16 to 30 hours at media powder ratios varying between 5 to 1 and 10 to 1. Triethanol amine (0.5% by weight) is added as a milling and antipaking aid.

After milling the powder is slurried in sufficient acetone to insure fluidity. To this slurry is added 2% polyvinyl butyral (PVB) as a binder. The powder binder is then dried to remove acetone under an air stream or in low temperature ovens ($\leqq 50°$ C.). The powder is then deagglomerated by milling in rubber lined drums at media to powder ratios stated above for 1 hour. Following this operation, the powder is screened through 83 mesh screens, and stored in plastic bags until pressed.

Pressing of green ceramic tubes from the above prepared powder is accomplished by filling an isostatic wet bag pressing tool to a uniform tap or pack density on a mechanical tapper. The powder is then pressed into its tubular shape at 30 kpsi pressure. After removal of the pressed piece it is cut to desired length and then subjected to an overnight bisque binder burn-out cycle. The green bisque ceramic tube is then ready for sintering.

Preparation of Encapsulation Chamber and Sintering of Shaped Green Body

Alpha-alumina tubes used for encapsulation purposes were purchased from Coors Porcelain Company. The ceramic body selected was their AD-998 closed one end tubes having approximately the following dimensions $1\frac{1}{4}''$ OD $\times 1''$ ID $\times 12''$ length.

Preparation of the $\alpha$-alumina tubes for use as encapsulation carriers generally was accomplished by two routes.

Route 1. This particular method involved filling of the $\alpha$-alumina tube with a 5.25 to 1 prefired mole ratio of $Al_2O_3$ to $Na_2O$ (hereinafter referred to as the soda component), and closing off of the open end with an H-brick end-plug (fusion cast beta-alumina). The encapsulation tube was then fired at 1400° C. for 8 hours. After cooling, the soda component was discharged, and the inside of the encapsulation carrier was wiped clean. A thin (0.002") platinum strip was then laid in the bottom of the carrier, upon which a green $\beta''$-$Al_2O_3$ ceramic tube was laid, (Tube J CSEI-61-#8). A 5 kpsi pressed pellet (~5 gm) of the soda component was placed inside the carrier toward the open end of the tube. The carrier tube was then closed off by inserting a H-brick end plug which had been wrapped with a platinum gasket. This sintering assembly was then introduced into a continuous zone sintering furnace. It was estimated that the maximum temperature-time profile that this tube attained was 5 minutes at 1585° C. The pass throught rate of the tube was 1.5" per minute.

After sintering, the tube was visually and dimensionally inspected. A short section sintered along with the tube was also subjected to property measurements such as density, resistivity and microstructure. The measured physical and dimensional properties are as follows: (out of cell measurements)

| Resistivity (300° C.) | Density | Microstructure |
|---|---|---|
| $\Omega$cm | g/cm$^3$ | esolated 100, |
| 3.84 | 3.19 | $\mu$m grains in a |
|  |  | fine grain matrix |

DIMENSIONS
cm

Closed End

-continued

| Length | Max Wall | Min Wall | Max Wall Min Wall | Max OD | Min OD |
|---|---|---|---|---|---|
| 20.1 | 0.106 | 0.100 | 1.060 | 1.485 | 1.472 |

Open End

| Max OD Min OD | Max OD | Min OD | Max OD Min OD |
|---|---|---|---|
| 1.009 | 1.490 | 1.481 | 1.006 |

This tube was then subjected to Na-Na cell testing. A summary of test results is presented below:

| Resistivity | Activation Energy | Total Ah/cm$^2$ (one way) |
|---|---|---|
| 8.9 initial 8.5 final | 4.56 | 1,052 |

Route 2. This method involved the light coating of an $\alpha$-alumina tube with a saturated solution of $Na_2CO_3$ (reagent grade) in water. After coating, the open end of the tube was closed off by inserting a tight fitting H-brick end-plug. The $\alpha$-carrier thus prepared was fired at 1400° C. for 8 hours. After cooling, a thin (0.002") platinum strip was placed in the bottom of the carrier upon which a green $\beta$-$Al_2O_3$ ceramic tube was placed. The open end of the tube was closed off by inserting a tight fitting H-brick end plug which had been wrapped with a platinum gasket. This sintering assembly was then introduced into a continuous zone sintering furnace. The maximum temperature-time profile to which the tube was subjected was 1585° C. for 5 minutes. The passthrough rate was set at 1.5"/minute. The out-of-cell physical and dimensional properties of this tube (EBEIII-98B#21) are as follows:

| Physical Properties | |
|---|---|
| Resistivity (300° C.) | 4.88 $\Omega$cm |
| Density | 3.20 g/cm$^3$ |

Microstructure - Isolated 50 $\mu$m grains in fine grain matrix
Dimensional Properties (cm)

| Length | 19.8 |
|---|---|
| Max Wall | 0.109 |
| Min Wall | 0.101 |
| Max Wall | 1.079 |
| Min Wall |  |

Open End

| OD | 1.526 |
|---|---|
| Min OD | 1.521 |
| Max OD | 1.003 |
| Min OD |  |

Closed End

| Max OD | 1.516 |
|---|---|
| Min OD | 1.465 |
| Max OD |  |
| Min OD | 1.035 |

This tube was subjected to Na-Na cell test. A summary of the test results follows:

| EBE III - 98B#21 | |
|---|---|
| Resistivity 300° C. | Activation Energy kcal/mole |
| 8.5 initial 7.9 final Total Ah/cm$^2$ | 4.58 |

-continued

| EBE III - 98B#21 | |
|---|---|
| Resistivity 300° C. | Activation Energy kcal/mole |
| one way | |
| 1,016 | |

Based upon the foregoing description of the invention what is claimed and desired to be protected by Letters Patent is:

1. An article of manufacture comprising a tubular capsule consisting essentially of alpha aluminum having a deposit of sodium oxide on its interior surfaces and having encapsulated therein a shaped green beta-type alumina bisque of compacted powder ready for sintering.

2. An article in accordance with claim 1 wherein said sodium oxide deposit on said interior surface was deposited thereon by exposure to a sodium environment at a temperature of at least about 1400° C. for at least about 8 hours.

3. An article in accordance with claim 1 wherein the cross-section of said capsule has a "V" configuration at its base and is curved on the top.

4. An article in accordance with claim 1 wherein said capsule includes a noble metal reaction barrier adapted to support the shaped body to be sintered such that said barrier separates said body from direct contact the interior surface of said chamber.

5. A method of preparing a sintered beta-type alumina body comprising:
    providing a tubular capsule consisting essentially of alpha alumina;
    encapsulating a sodium oxide bearing compound capable of releasing sodium oxide vapor at temperatures above 1250° C. within said capsule;
    heating said capsule to a temperature in excess of 1250° C. for more than 1 hour to deposit sodium oxide onto the interior surface of said capsule;
    cooling said capsule and removing the remaining sodium oxide bearing compound therefrom;
    encapsulating a shaped green bisque of compacted beta type alumina powder into said capsule; and
    heating said capsule to a sintering temperature in excess of 1500° C. for a sufficient time to provide the sintered beta-type alumina body.

6. A method in accordance with claim 5 wherein said sodium oxide bearing compound is selected from the group consisting of sodium aluminate, sodium acetate, sodium carbonate and $Na_2O \cdot X\, Al_2O_3$ wherein X is less than or equal to 11.

7. A method in accordance with claim 6 wherein said step of encapsulating a sodium oxide bearing compound comprises coating the interior surface of said capsule with an aqueous solution of sodium carbonate.

8. A method in accordance with claim 5 wherein said capsule with encapsulated sodium oxide bearing compound is heated to a temperature of at least about 1400° C. for at least about 8 hours.

* * * * *